United States Patent [19]

Wilson

[11] 4,331,741
[45] May 25, 1982

[54] NICKEL-BASE HARD FACING ALLOY

[75] Inventor: Richard K. Wilson, Monroe, N.Y.

[73] Assignee: The International Nickel Co., Inc., New York, N.Y.

[21] Appl. No.: 40,685

[22] Filed: May 21, 1979

[51] Int. Cl.³ .................... B32B 15/00; C22C 19/05
[52] U.S. Cl. .................................. 428/679; 75/171; 75/251; 428/680; 420/451; 420/453; 420/584
[58] Field of Search .................... 75/171, 122, 134 F, 75/251; 428/679, 680

[56] References Cited

U.S. PATENT DOCUMENTS

| | | | |
|---|---|---|---|
| 1,528,478 | 3/1925 | Hadfield | 75/171 |
| 1,572,996 | 2/1926 | Girin | 75/171 |
| 2,299,871 | 10/1942 | Baird | 75/171 |
| 2,392,821 | 1/1944 | Kreag | 78/103 |
| 2,396,552 | 2/1946 | Cape | 75/171 |
| 2,481,976 | 9/1949 | Cape | 75/171 |
| 2,540,107 | 2/1951 | English et al. | 75/171 |
| 2,783,144 | 2/1957 | Payson et al. | 75/171 |
| 2,955,934 | 10/1960 | Emery | 75/134 |
| 3,122,433 | 2/1964 | Greenewald | 75/171 |
| 3,160,500 | 12/1964 | Eiselstein et al. | 75/171 |
| 3,318,694 | 9/1967 | Heitmann et al. | 75/171 |
| 3,384,478 | 5/1968 | Firnhaber | 75/171 |
| 3,393,999 | 7/1968 | Lherbier et al. | 75/171 |
| 3,607,250 | 9/1971 | English et al. | 75/171 |
| 3,838,981 | 10/1974 | Foley et al. | 29/182 |
| 3,876,423 | 4/1975 | Firnhaber | 75/134 |
| 4,075,999 | 2/1978 | Danis | 123/191 |
| 4,118,254 | 10/1978 | Knotek et al. | 148/32 |
| 4,122,817 | 10/1978 | Matlock | 123/188 |

OTHER PUBLICATIONS

Cabot Corp., Stellite Div., Alloy No. 711 Data Sheet.
"Plasma—Arc Hardfacing Exhaust Valves" by W. M. Matlock, J. F. Kocis & E. T. Vitcha, Metals Progress, May 1978, pp. 38–43.
"Hardfacing—Picking the Proper Alloy", L. F. Spencer, Welding Engineer, Nov. 1970, pp. 39–47.
"Hardfacing with Co—Cr—X Alloys", L. VanMuysen, Cobalt 55, Jun. 1972, pp. 67–68.
Stellite, Hard—Facing Products, Brochure 1975.
Weld Rod X—782 Alloy, TRW Inc. article 1968.
Hardness and Abrasive—Wear Resistance of Ni—Cr—Mo—C Hardfacing Alloys by E. P. Wheelan, J. Metals, Jan. 1979, pp. 15–19.

*Primary Examiner*—R. Dean
*Attorney, Agent, or Firm*—Raymond J. Kenny

[57] ABSTRACT

A hard surfacing alloy composition formed from an alloy containing correlated percentages of chromium, molybdenum, tungsten, manganese, columbium, titanium, carbon, silicon and iron, the balance being nickel. The alloy exhibits a good combination of hot hardness at elevated temperature and weldability.

5 Claims, 1 Drawing Figure

I - RANGE FOR UNDILUTED STELLITE 6 WELD DEPOSITS (REF. I)
II - RANGE FOR UNDILUTED STELLITE I WELD DEPOSITS (REF. I)
HOT HARDNESS OF CASTINGS MADE FROM REMELTED ALLOY POWDERS.

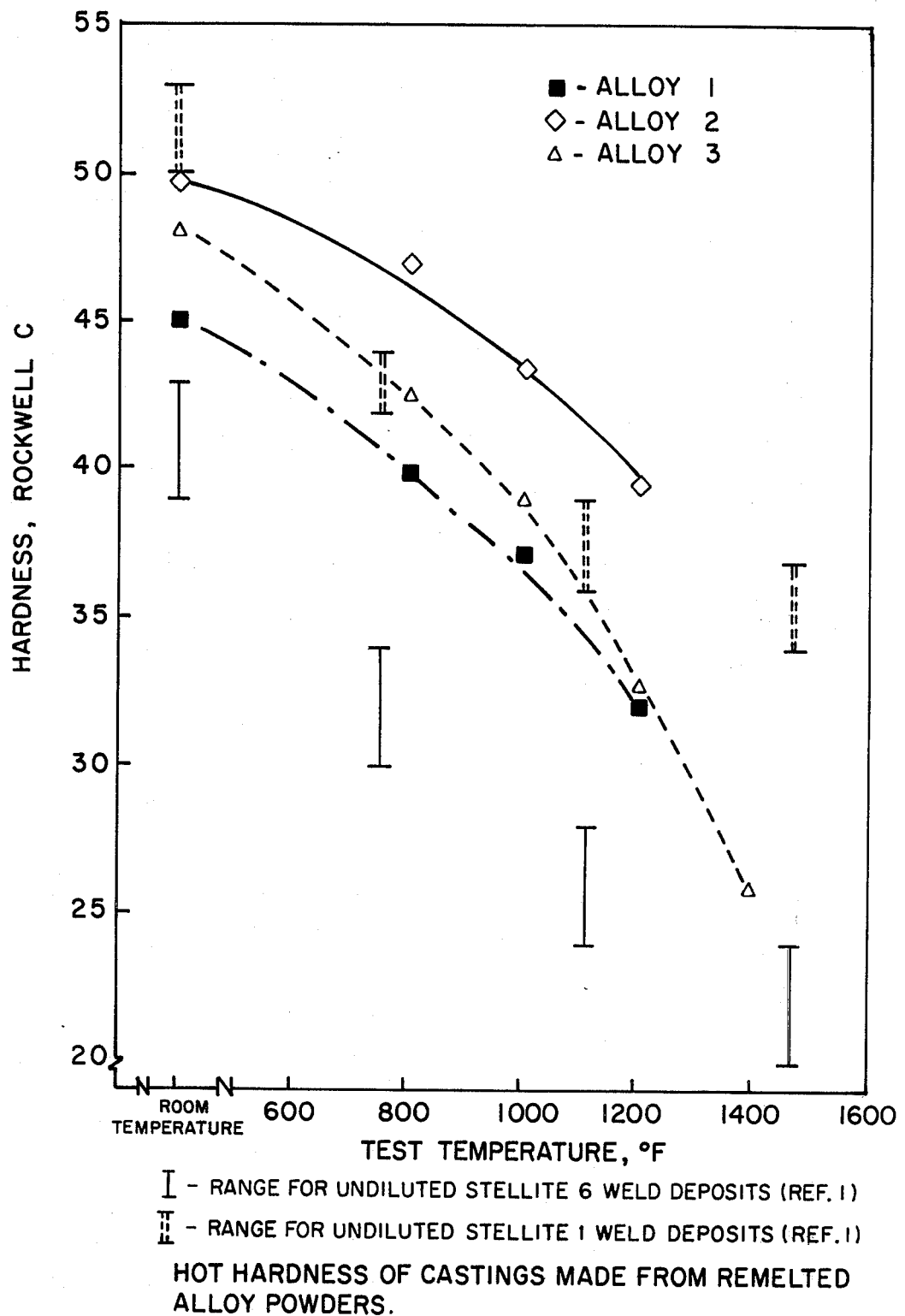

NICKEL-BASE HARD FACING ALLOY

The subject invention is concerned with nickel-base alloys, and is particularly directed to novel hard facing alloy compositions which afford a good combination of hot hardness, weldability and other desirable characteristics.

BACKGROUND OF THE INVENTION

As is generally known, cobalt-base alloys have found utility in a number of diverse applications. Indeed, such alloys, particularly the alloy designated STELLITE 6 (nominally 1%C - 28%Cr - 5%W - balance Co), have dominated the general market for wear resistant high temperature overlay materials, since they do manifest excellent hot hardness and weldability properties. Such attributes notwithstanding, the recent spiraling prices for cobalt together with uncertainty of supply have intensified efforts in evolving alternative materials.

To be an acceptable replacement for cobalt-base hard facing compositions, an alloy should exhibit a high level of hardness at 800° to 1200° F. and good weldability. Moreover, hard facing materials should be amenable to a variety of deposition processes, including automatic processes of high production rates, e.g., plasma transferred-arc welding (PTAW). This too, has been a virtue of the cobalt-base materials.

There are nickel-base alloys commercially available but many of these contain substantial amounts, relatively speaking, of silicon and boron. And while they have found utility, the inherent inability to provide adequate wear resistance at elevated temperatures has detracted from their use in successfully competing with the cobalt alloys, particularly as trim for applications such as automotive valves.

SUMMARY OF THE INVENTION

In any case, it has now been discovered that certain nickel-base alloys of controlled chemistry and containing correlated percentages of chromium, molybdenum, tungsten, manganese, columbium, titanium, carbon, silicon and iron not only offer good hot hardness at temperatures of the order of 800° to 1200° F. and satisfactory weldability, but such properties obtain using diverse deposition techniques, including PTAW.

DESCRIPTION OF THE DRAWING

The drawing presents hardness data as alloys within the invention and certain cobalt-base alloys.

DESCRIPTION OF PREFERRED EMBODIMENTS

Generally speaking, the most advantageous alloys in accordance with the instant invention contain (weight percent) about 27 to 30% chromium, about 7 to 9.5% molybdenum, about 4 to 6% tungsten, about 1.2 to 1.8% carbon, about 0.75 to 1.3% manganese, 0.05 to 0.5% titanium, 0.2 to 0.75% columbium, about 1 to 1.75% silicon, iron present up to 5%, the balance being essentially nickel. As contemplated herein the expressions "balance" or "balance essentially" in referring to nickel content do not preclude the presence of other elements commonly present as incidental constituents, including deoxidizing and cleaning elements, and normal impurities normally associated therewith in small amounts which do not adversely affect the basic characteristics of the alloys.

In carrying the invention into practice, care should be taken to observe the compositional limits as herein described. Should the chromium much exceed 30 or 31%, the tendency for sigma formation and attendant embrittlement problems, including weld cracking, is increased. With chromium levels significantly less than 27%, say below 25%, hardness, and thus wear resistance, and corrosion resistance are adversely affected.

Molybdenum in amounts much above 9.5 or 10% also can lead to sigma phase difficulties, particularly at the higher chromium levels, while levels below 6 or 6.5% detract from corrosion resistance.

Tungsten, as are chromium and molybdenum, is a carbide former. The precipitation of carbides of these elements markedly contribute to hardness and wear resistance and it is to advantage that tungsten be within the range of 4 to 6%, though a range of 3 to 8% is generally satisfactory. However, the percentages of tungsten and molybdenum should be further controlled and should not exceed a total of about 16%; otherwise, unnecessary difficulties can ensue. With less than 10.5% of tungsten plus molybdenum, hardness and wear resistance are needlessly subverted.

Manganese, titanium and columbium are deemed largely responsible for the good weldability characteristics of the alloys of the subject invention. These constituents contribute to crack resistance and soundness and also wetting of the substrate. While both titanium and columbium might not be absolutely essential, they should be present at least in amounts of 0.05 and 0.2%, respectively. However, they should not be used to the excess. Columbium and titanium are powerful carbide formers (preferential to chromium, molybdenum and tungsten). Unnecessarily high percentages lead to an excessively high concentration of these carbides, the size and morphology of which do not contribute to the desirable properties of hardness and wear resistance. Neither columbium nor titanium should exceed 1%. Most preferably at least one of columbium or titanium should be present.

In order that there be sufficient carbides present, the level of carbon should be at least 1%, and preferably 1.2% as above indicated. Little is to be gained with percentages much above about 2% and difficulties can arise in terms of carbide concentration at the grain boundaries. Moreover, greater care in respect of deposition control would likely be required particularly concerning deposition processes such as plasma transferred-arc welding.

As to other constituents, silicon promotes the formation of the laves phase which contributes to hardening. Further, weldability is enhanced because silicon assists in bringing about wetting of the substrate. Iron has a beneficial solid solution strengthening effect. It should not exceed 10%, however, since it also lends to sigma formation and attendance embrittlement problems. While it is of advantage that it be present, it preferably should not exceed about 5%.

In the light of the foregoing, alloys of the invention can contain 25 to 31% chromium, 6.5 to 10% molybdenum, 3 to 8% tungsten, the sum of molybdenum plus tungsten being at least 10.5% and not higher than 16%, 0.5 to 2% manganese, up to 1% columbium, up to 1% titanium, the sum of the manganese, columbium and titanium being at least 1%, 1 to 2% carbon, 0.75 to 2% silicon, up to 10% iron and the balance essentially nickel.

The following information and data are given as illustrative of the subject invention.

A series of blended alloy powders, Table I, were prepared using gas atomization, the powders being screened to −100 +325 mesh. The materials were melted under vacuum in an induction furnace, the molten metal flowing downward through a teeming nozzle of a tundish preheated to approximately 2200° F. Argon was used as the atomizing medium and under a high pressure of 350 psig, this to obtain a fine distribution of particle size.

TABLE 1

| Alloy | Cr % | Mo % | W % | Mn % | Ti % | Cb % | C % | Si % | Fe % |
|---|---|---|---|---|---|---|---|---|---|
| 1 | 27.3 | 7.35 | 4.2 | 1.27 | 0.22 | 0.69 | 1.2 | 1.33 | 4.2 |
| 2 | 28.8 | 8.9 | 4.5 | 0.84 | 0.12 | 0.35 | 1.45 | 1.56 | 4.5 |
| 3 | 30.3 | 10.5 | 4.8 | 0.4 | 0.02 | 0.9 | 1.7 | 1.79 | 4.8 |
| A | 25.3 | 5.2 | 3.9 | 1.85 | 0.35 | 2.3 | 0.87 | 1.03 | 3.8 |

Balance Ni plus impurities.
Al (0.11% retained) used for deoxidation.

Alloys 1–3 are within the invention whereas Alloy A is beyond the scope thereof.

Plasma transferred-arc welding was used because it is of a high deposition rate and provides thin, even deposits. Moreover, it provides a severe test because of its high cooling rate. The parameters were:

| | | | |
|---|---|---|---|
| voltage | 30 volts | slope | 2 seconds |
| current | 210 amps | travel delay | none |
| travel speed | 3.75 in/min | powderfeed | 35 gm/min. |
| preheat | none | powder gas (He) | 9ft³/hr. |
| oscillation width | 7/8 in. | plasma gas | 4ft³/hr. |
| oscillation speed | 120 in/min. | Shieldng gas | (argon) 40ft³/hr. |

Alloys 1 and 2 are deemed representative of the most advantageous embodiment of the invention, whereas Alloy 3 is marginal, at least for some type of deposition. In a first trial using PTAW, Alloy 3 was deposited as a bead on plate overlay. Weldability examination showed it to be free of cracks. The Alloy was also deposited on a valve. In this instance some cracks were found as well as porosity and there was some evidence in one case of inadequate wettability. The difference in deposits, at least in soundness, was attributed to the fact that in the valve overlay there isless heat input and a faster cooling rate since the valve was held against a water-cooled copper chill block during welding.

For experimental purposes hot hardness is conveniently used to assess wear characteristics. In this connection, two separate tests were used, one being a casting test (Table II) used to check the powders prior to PTAW overlaying. Thus, castings were made from undiluted hard facing alloy powder. This is a rather simulated test used to obtain an indication of the effects of base metal dilution and of the condidtions inherent in PTAW. The second test (Table III) was a PTAW overlay deposit.

TABLE II

| Alloy | Hot Hardness of Cast Simulations Rc (Test Temperature °F.) | | | | |
|---|---|---|---|---|---|
| | RT(Before) | 800 | 1000 | 1200 | RT(After) |
| 1 | 45.3 | 40.1 | 37.4 | 32.2 | 45.6 |
| 2 | 49.9 | 47.2 | 43.7 | 39.7 | 51.7 |
| 3 | 48.2 | 42.6 | 39.2 | 32.9 | 48.0 |
| A | Poor Casting - Not Tested | | | | |

TABLE III

| Alloy | Hot Hardness of Plasma Transferred-Arc Welds, Rc (Test Temperature °F.) | | | | |
|---|---|---|---|---|---|
| | RT(Before) | 800 | 1000 | 1200 | RT(After) |
| 1 | 44.2 | 40.0 | 35.4 | 29.4 | 42.7 |
| 2 | 46.0 | 37.7 | 35.3 | 30.7 | 42.3 |
| 3 | 45.2 | 39.6 | 38.0 | 31.7 | 45.7 |
| A | 29.3 | <20 | <20 | <20 | 27.0 |

RT - Room Temperature

The casting of Alloy A, Table II, was not tested for hot hardness by reason of poor surface quality. Though the alloy would be expected to manifest satisfactory weldability, its hardness was found on the low side. In contrast, the hot hardness of Alloys 1, 2 and 3 was found satisfactory over the range of 800° to 1200° F., Alloy 2 being preferred.

All four alloys 1–3 and A produced satisfactory deposits as bead on plate overlays. Cross-section specimens showed considerably less porosity than present in the previously discussed valve overlay deposit. This is consistent given the difference in welding conditions for the two types of substrate configurations. Overlay on plate involves higher heat input and results in the weld metal remaining molten longer. This in turn allows a greater amount of gases to escape from the deposits before solidification.

FIG. 1 offers a general comparison in terms of castings made from the remelted powders between Alloys 1, 2 and 3 and undiluted weld deposits of the cobalt-base alloy Stellite 1. Over the range of 800° to 1200° F., the alloys of the invention compare rather favorably.

The above data has been given in connection with atomized alloy powders. However, it is to be understood that other product forms can be utilized for hard surfacing.

While the alloys of the invention are of general utility, particularly where hardness, wear resistance, weldability and corrosion resistance are required, the invention is deemed particularly useful as valve trim for internal combustion engines and valves in the chemical and process industries.

I claim:

1. A nickel-base alloy suitable for use as a hard surfacing material and characterized by good weldability and elevated temperature wear resistance, said alloy consisting of (weight percent) about 27 to 30% chromium, about 7 to 9.5% molybdenum, about 4 to 6% tungsten, about 0.75 to 1.3% manganese, 0.05 to 0.5% titanium, 0.2 to 0.75% columbium, about 1.2 to 1.8% carbon, 1 to 1.75% silicon, iron up to about 5%, and the balance essentially nickel.

2. An alloy in accordance with claim 1 in powder form.

3. A weld overlay deposit formed from the alloy of claim 1.

4. A nickel-base alloy useful as a hard surfacing material and consisting of (weight percent) 25 to 31% chromium, 6 to 10% molybdenum, 3 to 8% tungsten, the sum of the molybdenum plus tungsten being at least 10.5% but not higher than 16%, 0.5 to 2% manganese, up to 1% columbium, up to 1% titanium, the sum of the manganese, columbium and titanium being at least 1%, 1 to 2% carbon, 0.75 to 2% silicon, up to 10% iron and the balance essentially nickel.

5. An alloy in accordance with claim 4 in which at least one of columbium and titanium is present.

* * * * *